July 14, 1953 — V. J. DAVID — 2,645,133
CHAIN LINK
Filed March 7, 1949 — 2 Sheets-Sheet 1
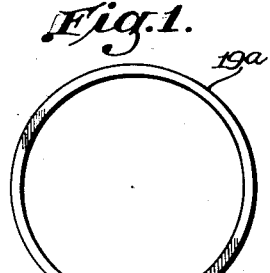
Fig. 1.
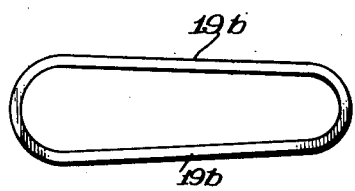
Fig. 2.
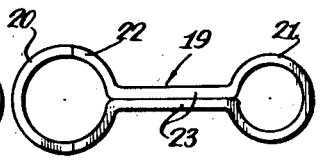
Fig. 3.
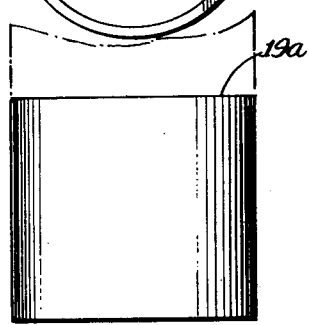
Fig. 4.
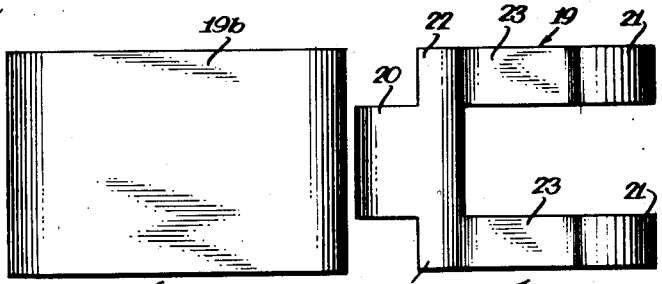
Fig. 5.
Fig. 6.
Fig. 7.
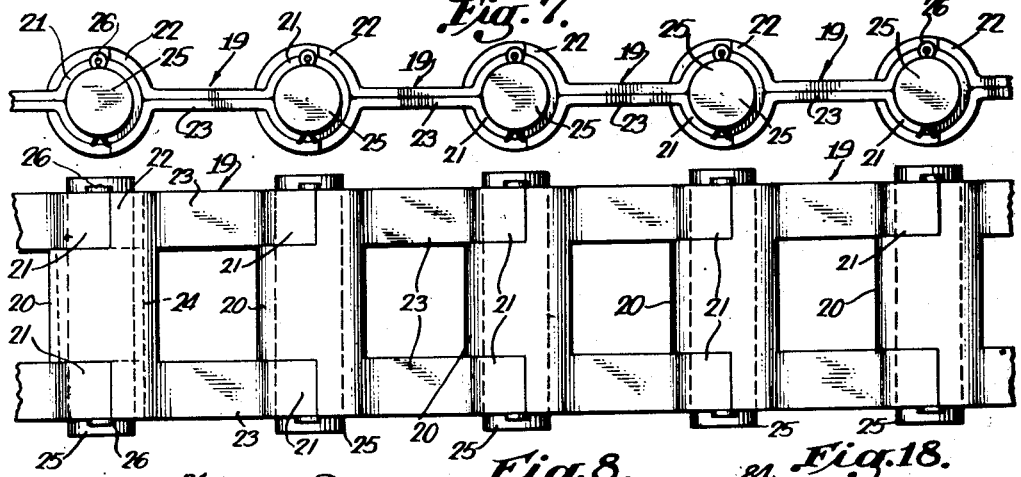
Fig. 8.
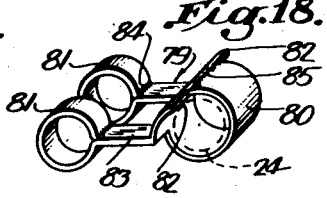
Fig. 18.
Fig. 9.
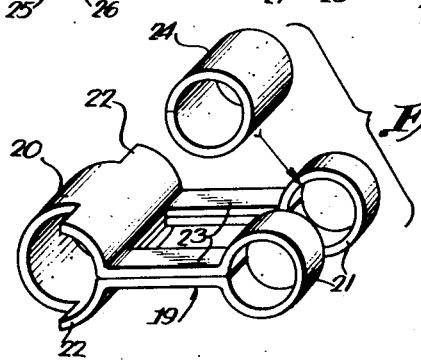
INVENTOR.
Vernon J. David

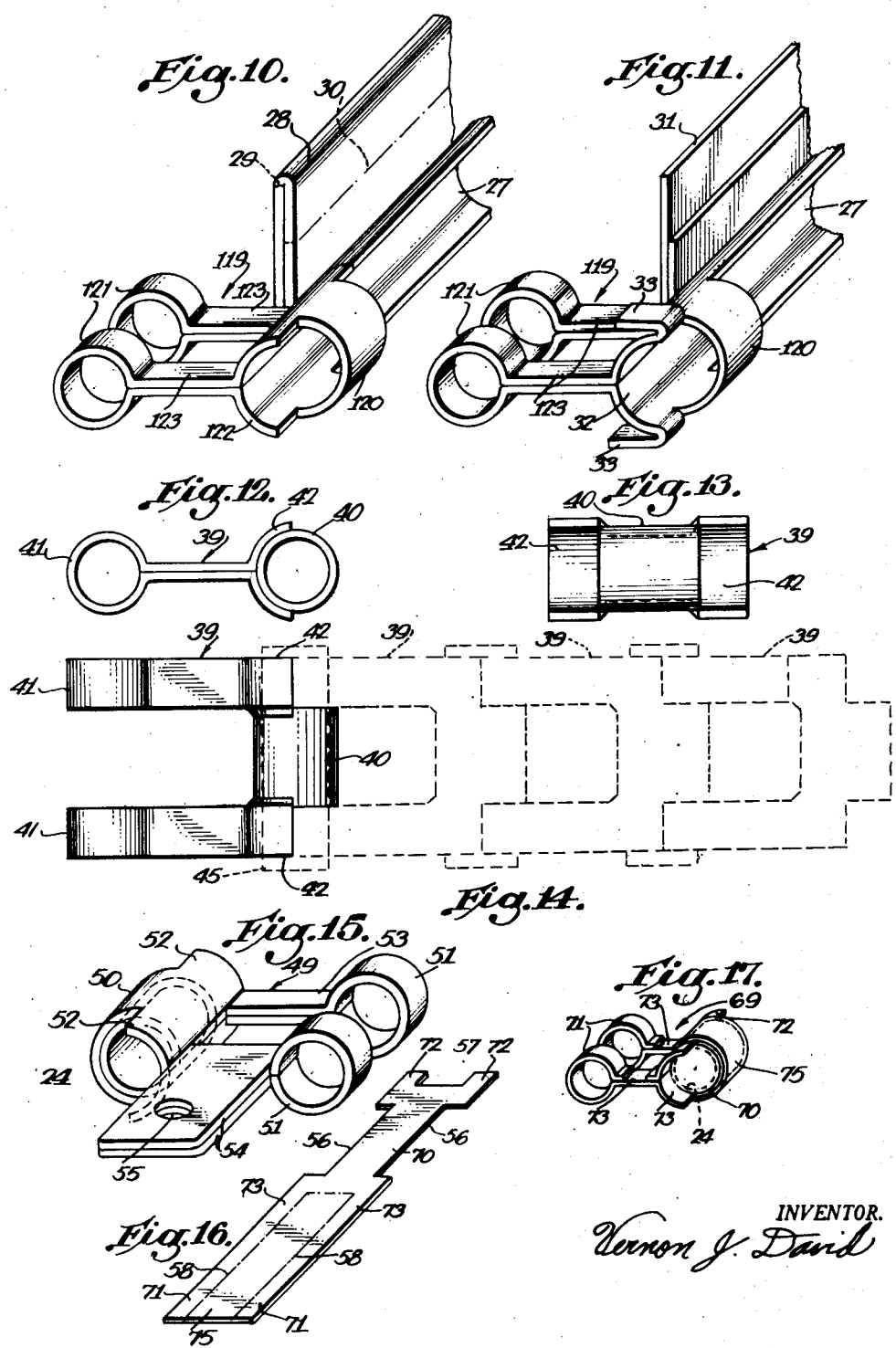

Patented July 14, 1953

2,645,133

UNITED STATES PATENT OFFICE 2,645,133

CHAIN LINK

Vernon J. David, Durham, Kans.

Application March 7, 1949, Serial No. 100,034

6 Claims. (Cl. 74—250)

My invention relates to chain links, and more specifically to that type of chain link which comprises a single hollow cylindrical knuckle located centrally of one end of the link and a pair of laterally-spaced hollow cylindrical knuckles located in the other end of the link, the last-mentioned knuckles having their inner end edges immediately outside of the planes defining the outer end edges of the single knuckle, whereby a plurality of such links may be readily connected together by inserting the single knuckle of one link between the laterally spaced lug knuckles of a second link and connecting the two links together by a transversely-disposed pin rotatably seated in the aligned single and laterally-spaced knuckles of the connected links. Such links are well known and were widely used in the past as belts for machine gun cartridges, wherein the cartridge comprised the pin insertable through the aligned knuckles of adjacent links to connect adjacent links together. While the links according to the invention are capable of being used to form machine gun belts, they are primarily not so intended. It is contemplated that the links according to the invention be used commercially to form chains, particularly chains as are adapted to be driven by sprockets to provide a driving connection between two shafts.

With the foregoing in view, it is an object of my invention to provide an improved chain link of the type described.

A further object is to provide an improved chain link of the class described which includes integral, laterally directed extensions on the single knuckle, which extensions are of arcuate configuration and disposed concentrically to the axis of the single knuckle, and wherein the extensions are adapted to either slidably engage or approach in various degrees of nearness the outer surfaces of the laterally-spaced knuckles of an adjacent link to which the first link is connected.

A further object is to provide an improved link for a sprocket-driven chain, which link is formed from a single blank of sheet material, and wherein a portion of the stock of the blank is adapted to be disposed concentrically about the single knuckle to provide a wearing surface of double thickness engageable with a sprocket. A further variation to this invention is obtained through the severance of the above stated portion of stock from the single knuckle whereby an element of rotatability is obtained, analogous to roller chains now in use.

Additional advantages accomplished by this invention are obtained through the use of a bushing or sleeve, whereby better equalization of wear is obtained through utilization of fore-stated sleeve in either fixed or rotatable position, relative to the link knuckles.

Also claimed in this invention through fore-stated integral design features, large areas are presented to resist lateral and longitudinal strain and wear, as well as that resulting from a combination of the fore-stated stresses.

Other objects and advantages reside in the particular structure of the invention, combination and arrangement of the several parts, and/or the particular method or mode of making the same, all of which will be readily understood by those skilled in the art upon reference to the attached drawings in connection with the following specification, wherein the invention is shown, described and claimed.

In the drawings:

Figures 1, 2 and 3 are end elevations of a length of tubing showing three stages in the formation of the same into one form of link according to the invention;

Figures 4, 5 and 6 are plan views corresponding to Figures 1, 2 and 3;

Figure 7 is an end elevation of a belt formed from a plurality of links of the type shown in Figures 3 and 6;

Figure 8 is a plan view of the chain of Figure 7;

Figure 9 is an exploded perspective view of a link of the chain of Figures 7 and 8;

Figure 10 is a fragmentary perspective view showing a modified form of link;

Figure 11 is a fragmentary perspective view showing a further modified form of link;

Figure 12 is an edge elevation of a further modified form of link;

Figure 13 is an end elevation of the modified form of link of Figure 12, looking from the right of Figure 12;

Figure 14 is a plan view of the link of Figures 12 and 13 showing the manner in which it is connected to adjacent links to form a chain, the adjacent links being shown in broken lines;

Figure 15 is a perspective view of a further modification of the link;

Figure 16 is a perspective view of a blank for forming a still further modified form of link;

Figure 17 is a perspective view of a link formed from the blank of Figure 16;

Figure 18 is a perspective view of a still further modified form of link.

Referring specifically to the drawings, wherein like reference characters have been used throughout the several views to designate like parts, and referring at first to the form of invention disclosed in Figures 1 to 9, inclusive, 19 generally designates a chain link which includes a single hollow cylindrical knuckle 20 formed centrally on the front end of the link and a pair of laterally-spaced, hollow, cylindrical knuckles 21 formed on the rear end of the link. In this, as well as in certain other forms of the invention, the link 19 is formed from a short length of hollow, cylindrical tubing 19a, Figure 1, and Figure 4, which is initially more or less flattened, as at 19b, Figures 2 and 5, about a suitable mandrel, and is thereafter formed as a completed link, as illustrated in Figures 3 and 6, by cutting away certain portions of the blank. Thus, an intermediate rear and central portion of the blank is cut away to provide the laterally-spaced knuckles 21, the inner edges of which are just outside the outer end edges of the single knuckles 20. Likewise, forward corner portions of the blank are cut away to provide the single knuckle 20 and arcuate lateral extensions 22 on either side thereof. The outer end edges of the extensions 22 are flush with the outer end edges of the laterally-spaced knuckles 21. As clearly seen in Figure 3, and in Figure 9, and in Figure 7, the inside diameter of the single knuckle 20 is substantially larger than the inside diameter of the laterally-spaced knuckles 21. Indeed, the inside diameter of the single knuckle 20 corresponds substantially to the outside diameter of the laterally-spaced knuckles 21. Moreover, as clearly seen in Figures 3 and 7, the extensions 22 have inner surfaces concentric to the axis of the single knuckle 20 and flush with the inner surfaces of such knuckle. It is noted that the arcuate extensions 22 are forewardly directed, whereby, as best seen in Figure 8, they are adapted to rotatably receive therein the outer surfaces of the laterally-spaced knuckles 21 of an adjacent link 19. As best seen in Figures 8 and 9, a sleeve 24 is provided which has an outside diameter corresponding to the inside diameter of the single knuckle 20 and an inside diameter corresponding substantially to the inside diameter of the laterally-spaced knuckles 21. Moreover, the sleeve 24 is substantially coextensive in length with the single knuckle 20, and is adapted to be slidably and rotatably received therein. With the sleeve 24 in position in the single knuckle 20, the laterally-spaced knuckles 21 of an adjacent link 19 are brought up into axial alignment with the sleeve 24. Thereafter, a pin 25 may be inserted through the aligned knuckles 21 and 20, whereby to connect adjacent links 19 together. The pin 25 may be secured in position in any suitable manner, as by the cotter pins 26 inserted through the apertures formed through the end of the pin. From the foregoing, it is apparent that the extensions 22 provide support for the laterally-spaced knuckles 21 of an adjacent and connected link, to limit lateral play in the chain, and to strengthen the same against lateral as well as longitudinal stresses. Also, the extensions 22 materially strengthen the link by strengthening the connection of legs 23 to the single knuckle 20.

In the form of invention of Figure 10, there has been disclosed a link according to the invention which is adapted to be combined with the lift of an endless conveyer. In this form of the invention, there are provided a pair of links 119, only one of which is shown, and each of which is substantially identical to the link of the first-described form of invention. Thus each of the links 119 comprises a single knuckle 120 formed at one end and a pair of laterally-spaced knuckles 121 connected to the knuckle 120 by laterally-spaced legs 123. Moreover, the outer side of each front end of each link 119 is formed with a laterally-directed extension 122 corresponding to one of the extensions 22 of the first-described form of invention. However the inner front side of each link 119 is formed with a relatively longer arcuate extension 27 which connects the two links 119 together in laterally spaced and aligned relation. Moreover, the intermediate stock between the laterally-spaced links 119 is severed from the inner end edges of the innermost knuckle 121 and innermost leg 123. Thereafter, such bight of the stock is flattened and upwardly directed, as at 28, to provide a conveyer lift. It is apparent from the foregoing that when a number of laterally-spaced pairs of links 119 and lifts 28 are connected together, as described in the first-described form of invention, an endless conveyor will be provided in combination with a drive chain for the same.

In the form of invention in Figure 11, a link 119 substantially similar to that of the form of Figure 10 is formed, but differs therefrom in that the stock of the blank intermediate the laterally-spaced and aligned links is cut away partially, as on the lines 29 and 30, Figure 10, whereby to provide an upwardly-directed conveyor lift 31 which is relatively thicker at the base by being two-ply and relatively thinner at the top by being formed from a single ply. Also, this form of the invention illustrates a modification of the lateral extension 33 which may well be applied to all forms of the invention. Thus, the outermost lateral extension 32 is provided with free ends which are rearwardly directed in vertically-spaced relation to provide guards for the extensions 32.

Figures 12, 13 and 14 illustrate a further modification of the device and disclose a link generally indicated at 39 and which includes a single knuckle 40 and a pair of laterally-spaced knuckles 41 at the rear end. In this form of the invention, the inside and outside diameters of the knuckles 40 and 41 are substantially identical, whereby a pin 45 may be readily inserted through aligned sets of knuckles 40 and 41 to connect adjacent links 39 together, as previously described. This form of the invention eliminates the need for a sleeve, such as the sleeve 24, to increase the strength of the link and to reduce the diameter of the single knuckle 40. However, to enable the laterally-spaced knuckles 41 to be correctly aligned with 40, the single knuckle, and securely pivotally attached thereon, in such manner as to resist lateral and longitudinal stresses, I have provided the lateral arcuate extensions 42 on either side of the single knuckle 40 and the inner surfaces of such extensions are radially outwardly offset so as to lie substantially flush with the outer surface of the single knuckle 40. By thus offsetting the extensions 42, they are enabled to have a close pivotal fit with the laterally-spaced knuckles 41 of an adjacent link, as clearly shown in Figure 14. In the modification of Figure 15, a structure is provided which includes a link 49, which includes a single cylindrical knuckle 50 on the front end and a pair of laterally-spaced knuckles 51 on the rear end corresponding to the like structures of the previously-described form of the invention. Also, the forward end is provided with a pair of laterally-directed extensions 52 corresponding to a similar extension, or extensions, previously described. Moreover, one leg 53 connects the front and rear ends as in the previously-described forms of the invention. However, the opposite leg is laterally directed to provide superposed tabs 54 which extend laterally beyond the end planes of the adjacent knuckle 51 and extension 52. Moreover, the tabs 54 are formed with any suitable means, such as the vertically-disposed apertures 55, for connecting the link to an endless conveyor or one of the lifts thereof.

Figures 16 and 17 illustrate a further modification of the invention. In the previously-described forms of the invention, the links are made from tubular stock, but in the form of Figures 16 and 17, the links are made from sheet stock. Thus, Figure 16 illustrates a blank for forming a link generally designated at 69. Thus, the blank is substantially rectangular but has side portions thereof cut away, as at 56, to provide a narrow portion 70 adapted to be bent into cylindrical form to provide the single knuckle at the forward end of the link 69. The front end of the blank is cut away, as at 57, to provide portions 72 providing the lateral extensions on either side of the single knuckle 70. A rear portion of the blank is formed with a pair of parallel slits 58 extending longitudinally of the blank and providing side strips. The free ends portions of the side strips are adapted to be bent into cylindrical form to provide the laterally-spaced knuckles 71, while the tethered ends of the strips are adapted to provide the legs 73 for the link. Intermediate the strips providing the knuckles 71 and legs 73 there is provided a tongue 75 which is adapted to be wrapped about the single knuckle 70, whereby to provide a double thickness for the same and a wearing surface when the same is engaged by the teeth of a sprocket, not shown.

A further form of the invention is illustrated in Figure 18, and here again the link 79 is formed from a blank of flat sheet material. In this form of invention, the forward single knuckle 80 is formed on the front end, and a pair of laterally-spaced knuckles 81 are formed on the rear end of the link and connected to the knuckle 80 by legs 83. However, the free edges of the stock of the laterally-spaced knuckles 81 are welded to the tethered ends of the legs 83, as at 84. Likewise, the free end edge of the single knuckle 80 is butt welded, as at 85, to the intermediate portion of an upwardly-directed portion of the blank which provides the laterally-directed extensions 82. In this form of the invention, the extensions 82 are not semi-cylindrical, as in the first described forms, but nevertheless are arcuate and concentrically disposed about the axis of the front knuckle 80.

It should be understood that while certain forms of the invention are formed from tubular stock and other forms are formed from sheet stock, all forms may be formed from tubular stock or all forms may be formed from flat sheet stock. Moreover, it should be understood that the extensions providing the guards 33, Figure 11, may well be applied to all of the laterally-directed extensions of the single knuckles, if desired. Thus, while I have shown and described what are now thought to be the preferred embodiments of my invention, it should be understood that the same is susceptible of other forms and expressions. Consequently, I do not limit myself to the precise structures shown and described hereinabove except as hereinafter claimed.

I claim:

1. In a chain link of the type having a single hollow cylindrical knuckle located centrally of the front end of the link and a pair of laterally-spaced hollow cylindrical knuckles on the other end of the link, the improvement comprising integral lateral extensions on either side of said single knuckle, said extensions being forwardly directed and of arcuate configuration, said extensions and single knuckle having flush inner surfaces, said single knuckle having an inside diameter greater than the inside diameters of said laterally-spaced knuckles, a sleeve rotatable in said single knuckle and substantially coextensive in length therewith, and said sleeve and laterally-spaced knuckles having substantially identical inside diameters.

2. In a chain link of the type having a single hollow cylindrical knuckle located centrally of the front end of the link and a pair of laterally-spaced hollow cylindrical knuckles on the other end of the link, the improvement comprising integral lateral extensions on either side of said single knuckle, said extensions being forwardly directed and of arcuate configuration, said extensions being concentric to the axis of said single knuckle, the extensions and single knuckle having equal radii and the same center line whereby the inner surface of the extension is a continuation of the inner surface of the knuckle, and said link being formed from a single length of tubing.

3. In a chain link of the type having a single hollow cylindrical knuckle located centrally of the front end of the link and a pair of laterally-spaced hollow cylindrical knuckles on the other end of the link, the improvement comprising integral lateral extensions on either side of said single knuckle, said extensions being forwardly directed and of arcuate configuration, the extensions and single knuckle having equal radii and the same center line whereby the inner surfaces of the extensions are a continuation of the inner surface of the knuckle, longitudinal legs integral with said extensions and extending rearwardly thereof, and said legs including rear ends formed to provide said laterally-spaced knuckles.

4. In a chain link of the type having a single hollow cylindrical knuckle located centrally at the front end of the link and a pair of laterally spaced cylindrical knuckles at the other end of the link, the improvement comprising integral lateral extensions on either side of said single knuckle, said extensions being of arcuate configuration and concave forwardly, and said extensions and single knuckle having equal inner radii and the same center line whereby the inner surface of the extensions is a continuation of the inner surface of the single knuckle.

5. In a chain link of the type having a single hollow cylindrical knuckle located centrally at the front end of the link and a pair of laterally spaced cylindrical knuckles at the rear end of the link, the improvement comprising a single link of tubular stock, the central portion of the stock being pressed together to form parallel cylindrical sections on the forward and rear sides of the central portion, the corners of the forward cylindrical section being cut away to form a centrally positioned knuckle having lateral extensions on each end thereof, said lateral extensions being forwardly directed and of arcuate configuration, the inner surface of said lateral extensions being continuations of the inner surface of the single knuckle, and a central section of the other cylindrical section being cut away to form a pair of spaced knuckles at the rear end of the link.

6. A chain link comprising a continuous strip extending around a first loop and from the loop along a straight section, said strip continuing from the end of the straight section remote from the first loop in a second loop and then returning along the straight section to the first loop to form a pair of spaced loops joined by a double thickness of the strip, corners of one of the loops being cut away to form a single centrally positioned knuckle having lateral extensions from the end thereof and a central portion of the other loop being cut away to form spaced knuckles, the distance between the inner ends of the spaced knuckles being slightly greater than the length of the single knuckle.

VERNON J. DAVID.

References Cited in the file of this patent

UNITED STATES PATENTS

| Number | Name | Date |
|---|---|---|
| 494,962 | Ley | Apr. 4, 1893 |
| 694,870 | Levalley | Mar. 4, 1902 |
| 892,965 | Sevcik | July 7, 1908 |
| 1,608,340 | Scheidy | Nov. 23, 1926 |
| 1,938,056 | Taylor | Dec. 5, 1933 |
| 1,972,297 | Hall | Sept. 4, 1934 |
| 2,234,449 | Pray | Mar. 11, 1941 |